(12) United States Patent
Kilburn

(10) Patent No.: US 7,022,912 B1
(45) Date of Patent: Apr. 4, 2006

(54) CONDUIT RACK JUNCTION BOX

(76) Inventor: Robert J. Kilburn, 34 Merion Rd., Marlton, NJ (US) 08053

( * ) Notice: Subject to any disclaimer, the term of this patent is extended or adjusted under 35 U.S.C. 154(b) by 32 days.

(21) Appl. No.: 11/073,213

(22) Filed: Mar. 5, 2005

(51) Int. Cl.
*H02G 3/08* (2006.01)

(52) U.S. Cl. .............. 174/50; 174/48; 174/58; 248/906

(58) Field of Classification Search .......... 174/50, 174/48, 58, 63, 17 R; 220/3.2, 4.02; 248/906; 439/535
See application file for complete search history.

(56) References Cited

U.S. PATENT DOCUMENTS 5,448,012 A * 9/1995 Jacob .................. 174/48
6,066,803 A * 5/2000 Hagarty .............. 174/50

* cited by examiner

*Primary Examiner*—Dhiru R. Patel

(57) ABSTRACT

An electrical junction box is employed for use in conduit rack systems. The junction box having two separate enclosed spaces, the first space enclosed by an upper section and the second space enclosed by a second section which extends perpendicularly from the first section. External surfaces of the first and second sections form dual step-like configurations on either side of the box which form two accessways or pathways for positioning and accepting straight runs of conduit laterally and over the junction box, thus eliminating the need for separating and bending runs of conduit. Straight runs of conduit are connected, via joint members, at the ends of the junction box.

8 Claims, 3 Drawing Sheets

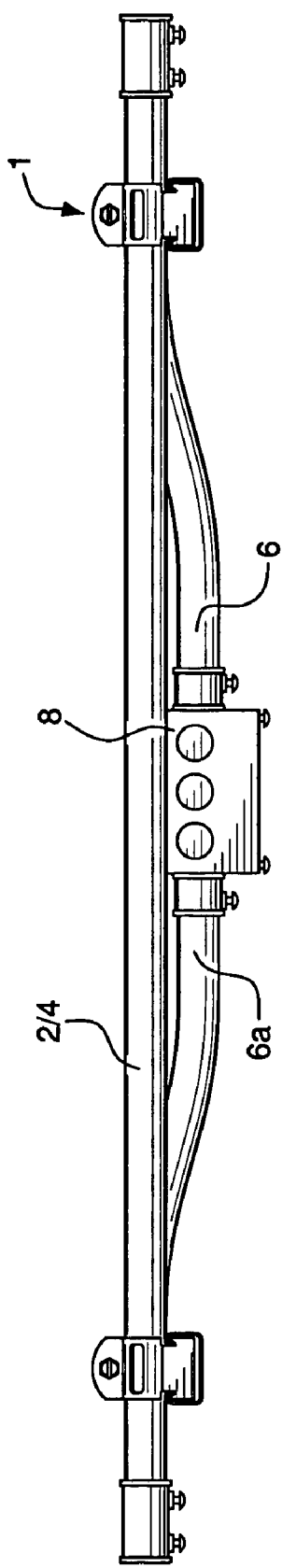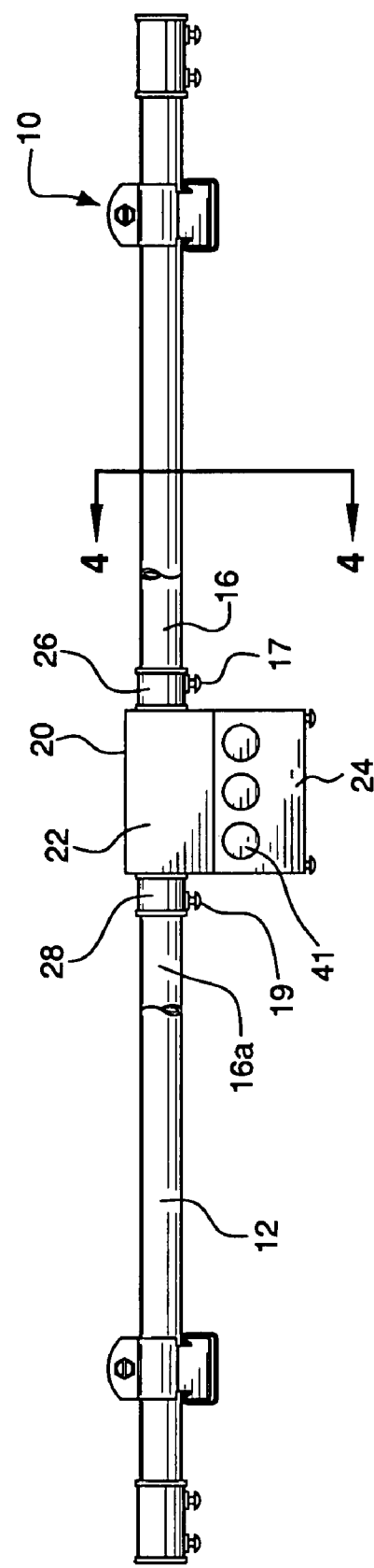

CONDUIT RACK JUNCTION BOX

BACKGROUND OF THE INVENTION

Electrical junction boxes, common in both residential and commercial construction, are safety enclosures generally used for housing electrical branching and circuitry. More specifically, junction boxes house electrical connections and terminations, electrical conductors, and fixtures, receptacles and other electrical components.

In certain construction applications, junction boxes are mounted and used for these electrical applications on suspended conduit racks, which are hung near ceilings or overhead spaces. These racks routinely consist of runs of protective piping or conduit which house electrical wiring for the system. The junction boxes are positioned within the racks, between the runs of conduit, for wiring connection and termination purposes.

An exemplar configuration of common usage of a junction box in a conduit rack system is shown in FIG. 1. Rack system 1 has three parallel runs of electrical wire containing conduit 2, 4, 6 and 6a. Junction box 8 is positioned below cover conduit runs 2 and 4, which extend over top of the box. Given the configuration of current conduit rack systems, it is necessary to bend protective conduits 6 and 6a for connection to junction box 8, in order to connect to the junction box without undue interference. Of course, bending such conduits requires added material and increased labor costs. Additional time must be spent to size and bend conduit so it can be properly fitted into the system. Bent conduit disrupts the planar configuration of conduit racks and, moreover, takes up added space under the rack.

SUMMARY OF THE INVENTION

It is thus an object of the present invention to overcome the disadvantages and limitations of prior electrical junction boxes used in conduit rack systems.

It is an object of the present invention to provide an electrical junction box for more efficient installation and use in suspended conduit racks.

It is a further object of the present invention to provide an electrical junction box which accepts runs of protective conduit in conduit rack systems without interferring with the horizontal run of the conduit.

It is still another object of the present invention to provide an electrical junction box which eliminates the need for bending runs of conduit in suspended conduit rack systems.

It is also an object of the present invention to provide an electrical junction box which, in connecting conduit runs, provides a space saving advantage in locating suspended conduit rack systems.

It is a further object of the present invention to provide an electrical junction box which allows straight runs of conduit in a conduit rack system to be suspended from a ceiling or overhead.

It is a further object of the present invention to provide an electrical junction box which saves both material and labor costs and time in the installation of suspended conduit rack system.

It is still another object of the present invention to provide an electrical junction box which is configured for use with standard conduit or which can be configured for use with any size run of conduit.

It is another object of the present invention to provide an electrical junction box which can be configured in a variety of different shapes and sizes.

These and other objects are accomplished by the present invention, an electrical junction box for use in conduit rack systems. The junction box consists of two separate enclosed spaces, the first space enclosed by an upper section and the second space enclosed by a second section which extends perpendicularly from the first section. External surfaces of the first and second sections form dual step-like configurations on either side of the box which form two accessways or pathways for positioning and accepting straight runs of conduit laterally and over the junction box, thus eliminating the need for separating and bending runs of conduit. Straight runs of conduit are connected, via joint members, at the ends of the junction box.

Novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

BRIEF DESCRIPTION OF THE DRAWINGS

FIG. 1 is an elevation view of a prior art junction box used in a conduit rack system.

FIG. 2 is an elevation view of the junction box of the present invention used in a conduit rack system.

DETAILED DESCRIPTION OF THE DRAWINGS

Figure 3:
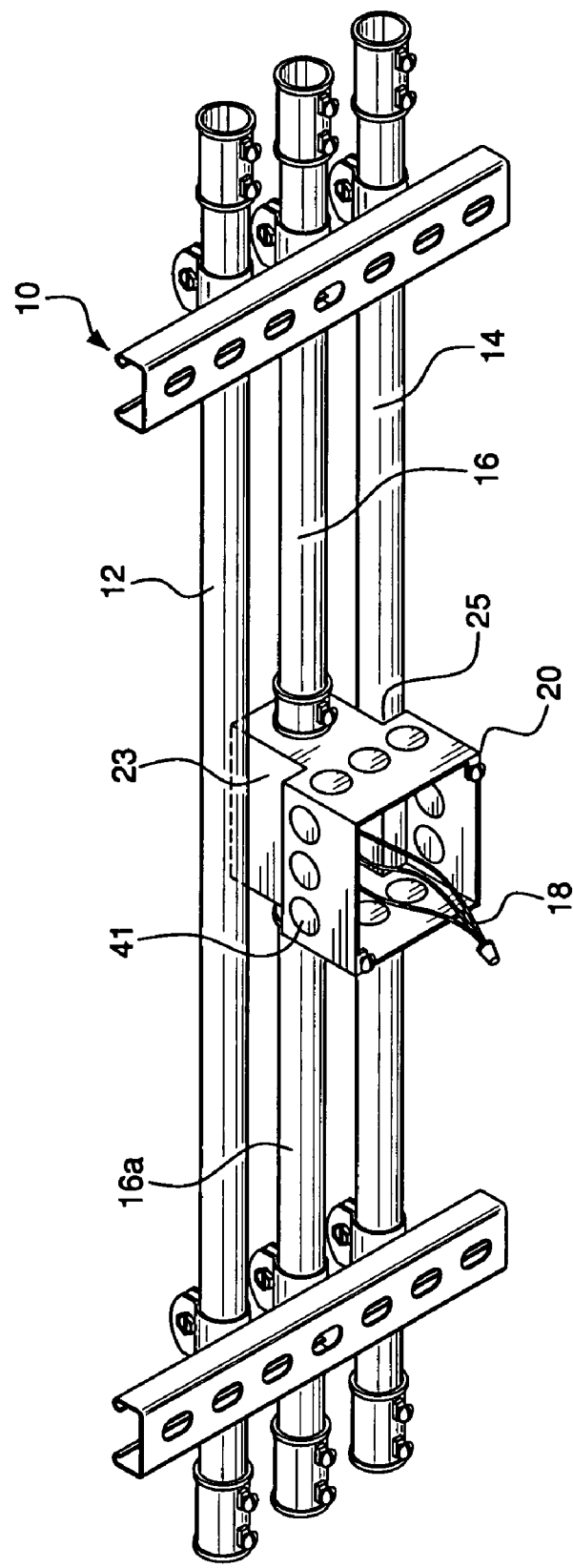
FIG. 3 is an isometric view of the junction box of the present invention used on a conduit rack system.
Figure 4:
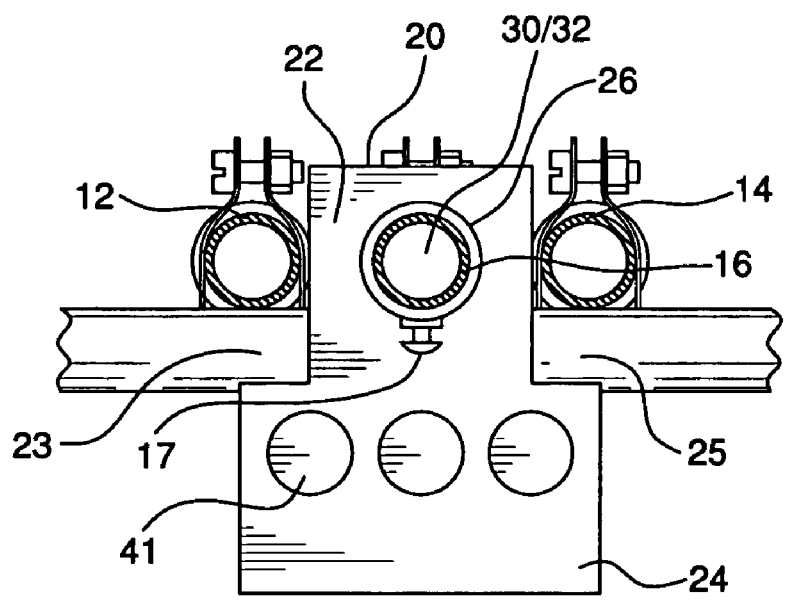
FIG. 4 is a cross-section view taken from FIG. 2.

Conduit rack system 10 for use with the present invention, shown in FIGS. 2–4, is configured to be suspended from a ceiling or overhead surface. It comprises a plurality of straight, parallel protective conduit runs 12, 14, and 16 and 16a which are used for housing electric wiring used for various electrical system operations. Branched wiring 18, used for fixtures, switching circuitry, or other electrical connection, is housed and protected in junction box 20 of the present invention.

Junction box 20 comprises first section 22 enclosing an upper portion of the box and second section 24 enclosing a lower portion of the box. Sections 22 and 24 are contiguous and form a large enclosed space. Conduit joint couplings 26 and 28 extend from openings 30 and 32 located one at each side of section 22. Joints 26 and 28 are configured for attachment to protective conduit runs 16 and 16a respectively and are secured to the conduit runs by pressure screw connections 17 and 19 or equivalent known connection means. Electrical wiring 18 is housed within conduit runs 16 and 16a and this wiring is available for branching, switching circuitry, fixtures, or other connections. Standard punch holes 41 are provided on lower section 24. Junction box 20 is shown with an open bottom. However, an appropriately shaped planar bottom piece is normally connected to enclose junction box 20 and protect wiring 18 and the other enclosed circuitry and fixtures, as is common practice.

Sections 22 and 24 are positioned substantially perpendicular to each other, with section 24 extending laterally outward of section 22. Two step-like configurations are formed from the two lateral exterior surfaces of sections 22 and 24 and these configurations result in two accessways or pathways 23 and 25, which permit straight conduit runs 12 and 14 to pass directly over section 24 and laterally of section 22 of junction box 10, without interfering with or having to travel around the junction box and wiring connections 18 therein.

Figure 5:
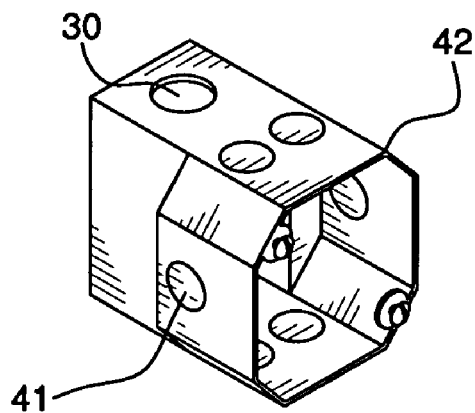
FIG. 5 is an isometric view of an alternate embodiment of the junction box of the present invention.
Figure 6:
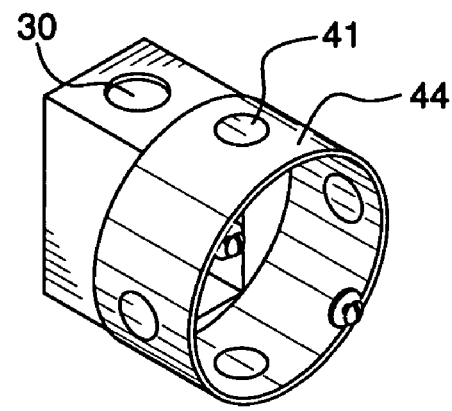
FIG. 6 is an isometric view of another embodiment of the junction box of the present invention.

Lower section 24 of junction box 20, as shown in FIGS. 2–4, is square or rectangular in configuration. It is contemplated that the junction box of the present invention can be manufactured with lower sections of various shapes, including, but not limited to an octagonal configuration 42 as shown in FIG. 5 and circular configuration 44 shown in FIG. 6. The lower section configuration of junction box 20 is a matter of preference and need of the user.

Therefore, junction box 20 of the present invention has a unique dual lateral pathway or accessway configuration which permits multiple runs of protective conduit to pass by the junction box without interference and without the need to bend conduit. The placement of junction box 20 also accomplishes substantial space saving advantages.

Certain novel features and components of this invention are disclosed in detail in order to make the invention clear in at least one form thereof. However, it is to clearly understood that the invention as disclosed is not necessarily limited to the exact form and details as disclosed, since it is apparent that various modifications and changes may be made without departing from the spirit of the invention.

What is claimed is:

1. A junction box for receiving electrical wiring contained within straight runs of protective conduit in an overhead, suspended protective conduit rack system comprising a plurality of parallel extending straight runs of protective conduit, said junction box comprising:
   a first enclosure means for housing electrical wiring, said enclosure means forming the upper section of the junction box;
   a second enclosure means for housing electrical wiring, said second enclosure means forming the lower section of the junction box and extending from and substantially perpendicularly to the first enclosure means, said first and second enclosure means being contiguous with each other;
   at least one of the first and second enclosure means having aperture means for the entry of one of the plurality of straight runs of protective conduit in the suspended conduit rack system and joint means for the connection of said straight runs of protective conduit to that enclosure means;
   said first and second enclosure means further comprising exterior surfaces which meet to form a step-like configuration and forming two conduit pathway means adjacent to each side of the upper section and over the lower section, whereby when said one of the plurality of straight runs of protection conduit from the suspended conduit rack system is connected to an enclosure means, additional straight runs of protective conduit from the suspended conduit rack system pass over the lower section and laterally of each side of the upper section, so as to be positioned within the pathway means.

2. The junction box as in claim 1 wherein the first and second enclosure means substantially enclose an open space.

3. The junction box as in claim 1 wherein the first enclosure means comprises the aperture means and the joint means and the second enclosure means is substantially rectangular in configuration.

4. The junction box as in claim 1 wherein the first enclosure means comprises the aperture means and the joint means and the second enclosure means is substantially circular in configuration.

5. The junction box as in claim 1 wherein the first enclosure means comprises the aperture means and the joint means and the second enclosure means is substantially octagonal in configuration.

6. An overhead, suspended protective conduit rack system for housing electrical wiring contained within runs of protective conduit, said system comprising:
   a plurality of runs of protective conduit containing electrical wiring suspended overhead by the conduit rack system;
   at least one junction box for receiving electrical wiring contained within at least one of the runs of protective conduit, said junction box comprising:
   a first enclosure means for housing electrical wiring, said enclosure means forming the upper section of the junction box;
   a second enclosure means for housing electrical wiring, said second enclosure means forming the lower section of the junction box and extending from and substantially perpendicularly to the first enclosure means, said first and second enclosure means being contiguous with each other;
   at least one of the first and second enclosure means having aperture means for the entry of one of the plurality of straight runs of protective conduit in the suspended conduit rack system and joint means for the connection of said straight runs of protective conduit to that enclosure means;
   said first and second enclosure means further comprising exterior surfaces which meet to form a step-like configuration and forming two conduit pathway means adjacent to each side of the upper section and over the lower section, whereby when said one of the plurality of straight runs of protection conduit from the suspended conduit rack system is connected to an enclosure means, additional straight runs of protective conduit from the suspended conduit rack system pass over the lower section and laterally of each side of the upper section, so as to be positioned within the pathway means.

7. The junction box as in claim 6 wherein the first and second enclosure means substantially enclose an open space.

8. The system as in claim 6 wherein the first enclosure means comprises the aperture means and the joint means and the second enclosure means is substantially rectangular in configuration.

* * * * *